D. O. BARRETT.
GAS AND AIR MIXING VALVE.
APPLICATION FILED NOV. 24, 1917.

1,292,677.

Patented Jan. 28, 1919.
2 SHEETS—SHEET 1.

WITNESSES
Oliver W. Holmes
A. L. Kitchin

INVENTOR
D. O. Barrett
BY
ATTORNEYS

D. O. BARRETT.
GAS AND AIR MIXING VALVE.
APPLICATION FILED NOV. 24, 1917.
1,292,677.
Patented Jan. 28, 1919.
2 SHEETS—SHEET 2.
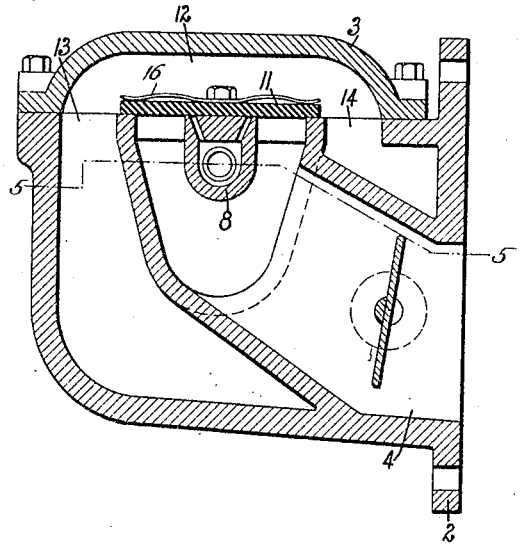
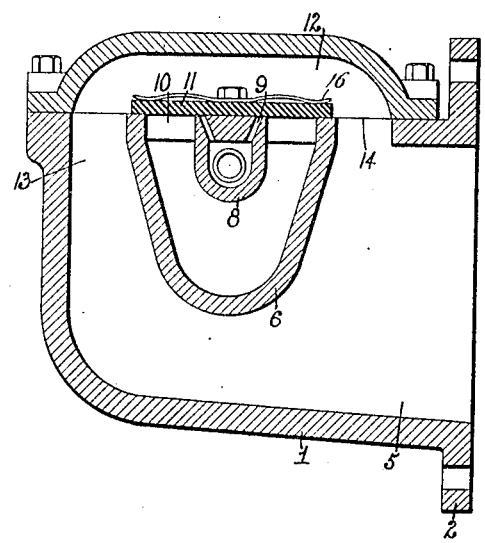
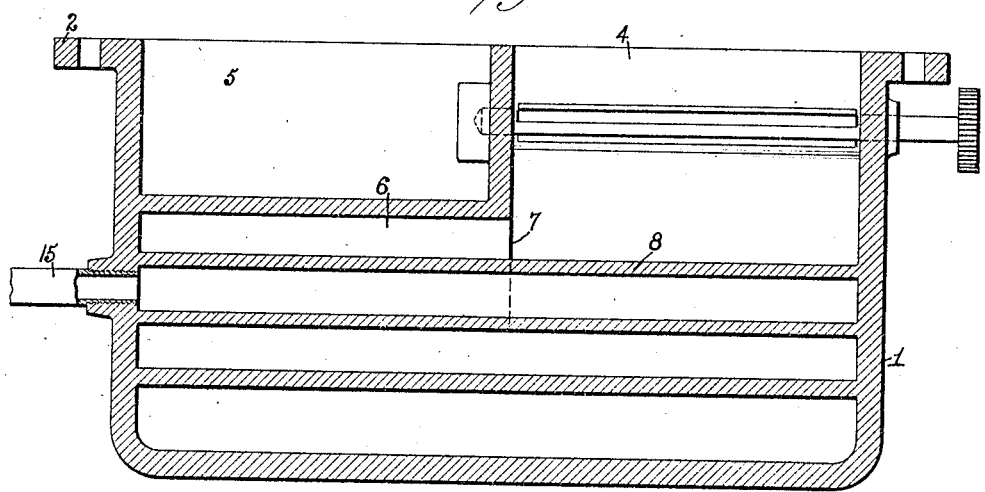
WITNESSES
INVENTOR
D.O.Barrett
BY
ATTORNEYS

UNITED STATES PATENT OFFICE.

DWIGHT O. BARRETT, OF LIMA, OHIO.

GAS AND AIR MIXING VALVE.

1,292,677.  Specification of Letters Patent.  Patented Jan. 28, 1919.

Application filed November 24, 1917. Serial No. 203,749.

*To all whom it may concern:*

Be it known that I, DWIGHT O. BARRETT, a citizen of the United States, and a resident of Lima, in the county of Allen and State of Ohio, have invented a new and Improved Gas and Air Mixing Valve, of which the following is a full, clear, and exact description.

This invention relates to mixing valves for internal combustion engines of the two-stroke cycle type and has for an object the provision of an improved air and gas mixing valve which will provide a properly proportioned and thoroughly mixed supply of air and gas during the continuous running of the engine.

Another object in view is to provide a mixing valve which may be bolted directly to the engine bed or cylinder and receive the air from the bed or any outside source and then mix the same with a predetermined quantity of gas.

A further object in view is the provision of a mixing valve in which a flap valve is utilized for regulating to a limited extent the proportion of air and gas drawn into the engine to which the device is secured.

In the accompanying drawings:—

Fig. 3 is a transverse section through Fig. 2 on line 3—3.

Fig. 4 is a transverse sectional view through Fig. 2 on line 4—4.

Fig. 5 is a horizontal sectional view through Fig. 3 on line 5—5.

Referring to the accompanying drawings by numerals, 1 indicates a casing formed in any suitable manner, as for instance, by being cast, said casing being supplied with a flange 2 provided with bolt holes whereby the casing may be bolted to the bed or cylinder of an engine of the two-stroke-cycle type. The casing 1 is open at the top, as shown in Figs. 3 and 4, but is provided with a cover 3 which is bolted or otherwise rigidly secured in place whereby an open space is provided for allowing air and gas to travel in a predetermined direction as hereinafter fully described.

The flange 2 is designed to be bolted to the casing of an internal combustion engine so that the air drawn into the casing 1 will be drawn from the bed of the engine, and consequently, will be more or less heated. This air is mixed with gas and is drawn into the cylinder as the engine operates, the detail construction of the engine and the way the mixture passes therein forming no part of the present invention. However, it will be noted that as the air fed to the mixing valve is from the bed of the engine the construction accomplishes two purposes, namely, the cooling of the moving parts of the engine by reason of the passage of air through the bed thereof and the provision of warm air to mix with the gas for producing a better explosive mixture.

Figure 1:
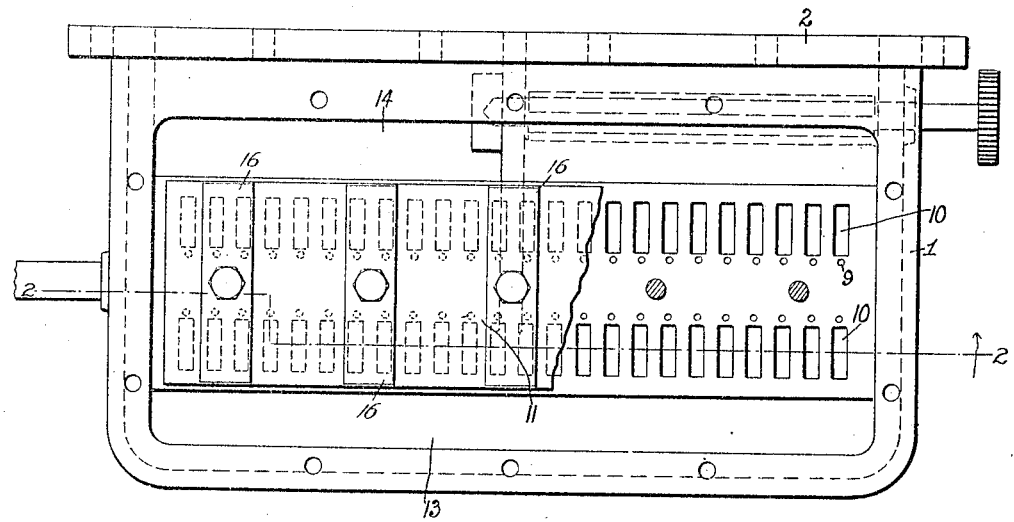
Figure 1 is a top plan view of a mixing valve disclosing an embodiment of the invention, the top or covering plate being removed.
Figure 2:
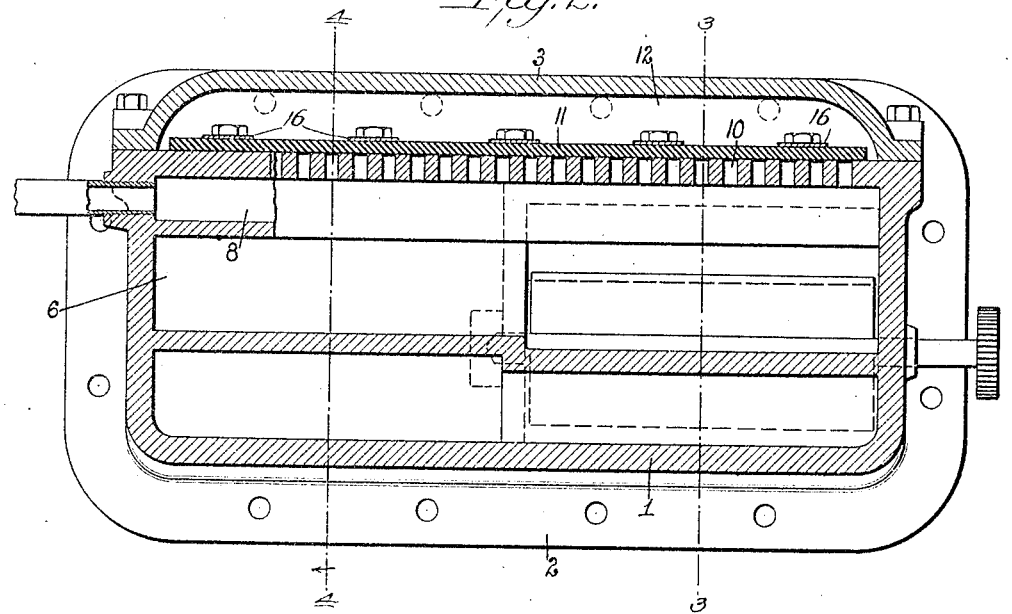
Fig. 2 is a longitudinal vertical section through Fig. 1 on line 2—2.

In operation the air is drawn in through the opening 4 and is mixed with the incoming gas, after which it is discharged or, rather, drawn into the cylinder of the engine, the mixture passing out of the casing 1 through the opening 5, which is on the same side as opening 4. As shown in Figs. 3 to 5, inclusive, the casing 1 is provided with a trough-shaped member 6 extending from one end of the casing to the other except for the cut-away portion 7, as shown in Fig. 5, opposite the inlet opening 4. A second substantially trough-shaped member 8 is provided in the trough-shaped member 6, said second trough-shaped member 8 having two rows of apertures 9, as shown in Fig. 1. A flap valve member 11 is bolted or otherwise rigidly secured to the center of the trough 8 and overlaps the apertures 9 and the slots 10. The flap valve 11 may be made from any suitable material, as for instance, leather, and is designed to move off its seat when a rarefaction or suction is produced by the engine whereby air is drawn through opening 4 into the interior of trough 6 and from thence through the slots 10, while a predetermined quantity of gas is drawn through the openings 9, said air and gas mixing as it passes through the space 12 and out through the apertures 13 and 14 to the outlet 5, which outlet discharges into the cylinder or into part of the casing of the engine, from which it passes to the cylinder. The gas trough 8 is supplied with gas from pipe 15, said pipe receiving the same from any suitable source. In order to regulate the incoming air a damper 16 may be utilized, if desired, said damper being of any suitable kind, as for instance, an ordinary butterfly design having the controlling rod 1, as shown more particularly in Fig. 5.

When the mixer is in use the engine to which it is secured produces a rarefaction or suction in the opening 5 and by said rarefaction or suction draws air in through opening 4, and as said air raises the valve 11 gas will escape through the openings 9 and mix with the air. The gas may be under pressure, if desired, or may be merely drawn in by the above mentioned suction. The gas and air pass downwardly through the openings 13 and 14 and become mixed during their passage so that when the mixture passes out the opening 5 a reasonably good mixture is provided. This mixture may pass directly into the cylinder engine or into part of the casing of the engine and from thence into the cylinder, according to the particular type of engine. To insure the closing of the valve 11 a number of springs 16 are provided, though these ordinarily are not necessary. A number of springs have been shown, but it will be evident that one large spring extending for the full length of the valve could be substituted without departing from the spirit of the invention.

In arranging the mixer or valve in position for use it may be arranged on the bed of the engine entirely or on the cylinder entirely as preferred, though usually the most advantageous place is near the juncture of the cylinder with the main part of the engine so that the air warmed by passing over the bed and engine casing will be drawn into the valve and mixed with the fuel. The provision of the openings 4 and 5 in the casing for providing an inlet and outlet on the same face permits the valve to straddle the partition in the engine casing so that the usual inlet may face into the space beneath the casing above the engine bed while the outlet may face either into the receiving chamber or into the cylinder of the engine.

What I claim is:

1. In a mixing valve of the character described, a casing provided with an inlet and outlet on the same face and an opening in the face at right angles to the first mentioned face merging into said inlet opening, a covering for the openings in the second mentioned face of said casing, said covering having the center thereof bowed so as to provide a space above the last mentioned face of the casing, means arranged in the casing extending for the full length thereof and to the opposite ends thereof forming a passageway, said inlet merging into said passageway, said means being provided with openings in its upper face, a gas supplying member arranged in said passageway provided with openings adjacent the first mentioned openings, and a flexible valve member mounted to normally cover all of said openings and direct the gas across the stream of air when open.

2. In an air and gas mixer of the character described, a casing provided with juxtapositioned inlet and outlet openings, on the same face, said outlet opening extending to the top of the casing, said top being open, means arranged in the casing forming a passageway merging into said inlet opening, said means having a plurality of openings in the upper face, said face being in line with the upper top of the casing, gas supplying means arranged adjacent the openings in said passageway, and a covering member for said top bowed so as to provide a passageway above the means forming the first mentioned passageway whereby when there is a suction or rarefaction in said inlet opening air and gas will pass from said first mentioned passageway and gas supplied through said second mentioned passageway to said outlet.

3. In an air and gas mixer of the character described, a casing provided on one side with an inlet and outlet opening, means arranged in the casing forming a passageway merging into said inlet, supply means having a plurality of openings in the upper face, a gas supplying means arranged adjacent the openings in said passageway and dividing the openings into two sections, and a covering member for said upper face formed so as to provide a passageway above the means forming the first mentioned passageway whereby when there is a suction or rarefaction in said inlet opening air and gas will pass through said first mentioned passageway and gas supplied through said second mentioned passageway to said outlet.

4. In an air and gas mixer of the character described, a casing provided on one side with an inlet and outlet opening, means arranged in the casing forming a longitudinal passageway merging into said inlet opening, supply means having a plurality of discharge openings in the upper face, a gas supply member extending centrally of said supply openings and dividing the supply openings into two sections, a flexible flap valve connected centrally of said body to the gas supply, said flap being of sufficient dimensions to overlap the gas openings and the air openings, and a covering member extending over said upper face forming a passageway above the air and gas supply means so that when there is a suction and rarefaction in said inlet opening air and gas will press against said valve and open the same and in opening the same the gas will be directed transversely of the supply of air so as to mix therewith.

DWIGHT O. BARRETT.